United States Patent
Tong

(10) Patent No.: US 10,284,063 B2
(45) Date of Patent: *May 7, 2019

(54) SYNCHRONOUS RELUCTANCE MOTOR

(71) Applicant: JTEKT CORPORATION, Osaka-shi, Osaka (JP)

(72) Inventor: Mingyu Tong, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 137 days.

This patent is subject to a terminal disclaimer.

(21) Appl. No.: 15/462,982

(22) Filed: Mar. 20, 2017

(65) Prior Publication Data

US 2017/0288514 A1    Oct. 5, 2017

(30) Foreign Application Priority Data

Mar. 29, 2016 (JP) ................................ 2016-066425

(51) Int. Cl.
*H02K 1/24* (2006.01)
*H02K 19/02* (2006.01)
*H02K 29/03* (2006.01)

(52) U.S. Cl.
CPC .............. *H02K 19/02* (2013.01); *H02K 1/246* (2013.01); *H02K 29/03* (2013.01); *H02K 2213/03* (2013.01)

(58) Field of Classification Search
CPC ............ H02K 1/22; H02K 1/24; H02K 1/246; H02K 1/30; H02K 19/02; H02K 19/10
See application file for complete search history.

(56) References Cited

U.S. PATENT DOCUMENTS

| | | | |
|---|---|---|---|
| 6,259,181 B1 * | 7/2001 | Kawano | H02K 1/246 310/162 |
| 6,713,923 B2 * | 3/2004 | Hino | H02K 15/03 310/156.38 |
| 2006/0284512 A1 * | 12/2006 | Lee | H02K 1/246 310/216.008 |

(Continued)

FOREIGN PATENT DOCUMENTS

| | | |
|---|---|---|
| CN | 204465182 U | 7/2015 |
| JP | H11-289730 A | 10/1999 |

(Continued)

OTHER PUBLICATIONS

Aug. 9, 2017 Extended European Search Report issued in Patent Application No. 17162384.6.

*Primary Examiner* — Tran N Nguyen
(74) *Attorney, Agent, or Firm* — Oliff PLC

(57) ABSTRACT

A plurality of flux barriers in each of flux barrier groups include arcuate portions formed in a polygonal region. The arcuate center of the arcuate portions in each of the flux barrier groups is set to the circumferential center point of the flux barrier group on the outer peripheral edge of a rotor. When regions of the rotor interposed between two flux barriers that are adjacent to each other in the flux barrier groups are defined as ribs, and portions of the rotor that are close to the outer periphery of the rotor in the regions of the rotor interposed between flux barrier groups that are adjacent to each other are defined as connecting portions, the ratio of the width of the connecting portions to the width of the ribs is 0.53 or more and 0.8 or less.

8 Claims, 8 Drawing Sheets

(56) References Cited

U.S. PATENT DOCUMENTS

| | | | |
|---|---|---|---|
| 2008/0145252 A1* | 6/2008 | Ku | F04C 18/3442 |
| | | | 418/54 |
| 2008/0290753 A1* | 11/2008 | Arimitsu | H02K 1/246 |
| | | | 310/156.36 |
| 2011/0241466 A1* | 10/2011 | Takahashi | H02K 1/246 |
| | | | 310/156.01 |

FOREIGN PATENT DOCUMENTS

| | | |
|---|---|---|
| JP | 2002-078251 A | 3/2002 |
| KR | 101251859 B1 | 4/2013 |
| KR | 20130080635 A | 7/2013 |
| WO | 2008/123636 A1 | 10/2008 |

\* cited by examiner

SYNCHRONOUS RELUCTANCE MOTOR

INCORPORATION BY REFERENCE

The disclosure of Japanese Patent Application No. 2016-066425 filed on Mar. 29, 2016 including the specification, drawings and abstract, is incorporated herein by reference in its entirety.

BACKGROUND OF THE INVENTION

1. Field of the Invention

The present invention relates to a synchronous reluctance motor for use in an electric power steering system, for example.

2. Description of the Related Art

There is known a reluctance motor in which a rotor is rotated utilizing only reluctance torque generated by variations in electromagnetic energy with respect to a position. The reluctance motor includes a switched reluctance motor (SRM) and a synchronous reluctance motor (SynRM). In the switched reluctance motor, the stator and the rotor have magnetic saliency. In the synchronous reluctance motor, the stator is structured in the same manner as that of a brushless motor.

In the synchronous reluctance motor, only the rotor, among the stator and the rotor, has magnetic saliency. The synchronous reluctance motor has a salient direction (hereinafter referred to as a "d-axis direction") in which magnetic flux flows easily, and a non-salient direction (hereinafter referred to as a "q-axis direction") in which magnetic flux does not flow easily, in accordance with the magnetic saliency of the rotor. Therefore, reluctance torque is generated by the difference between an inductance in the d-axis direction (hereinafter referred to as a "d-axis inductance") and an inductance in the q-axis direction (hereinafter referred to as a "q-axis inductance"), and the rotor is rotated by the reluctance torque (see Japanese Patent Application Publication No. 11-289730 (JP 11-289730 A)).

In the synchronous reluctance motor, the rotor is rotated utilizing only the reluctance torque, rather than using permanent magnets. Therefore, the synchronous reluctance motor generates small output torque compared to a motor that uses permanent magnets, and it is necessary to increase the output torque, even if only slightly.

SUMMARY OF THE INVENTION

It is an object of the present invention to provide a synchronous reluctance motor capable of generating large output torque with little torque ripple.

An aspect of the present invention provides a synchronous reluctance motor including a stator and a rotor, the rotor being provided with a number of flux barrier groups each constituted from a plurality of arcuate flux barriers and spaced from each other in a circumferential direction, the number of the flux barrier groups being equal to that of poles, and the flux barriers being disposed in a plurality of layers from an outer periphery toward a center and being convex toward the center. When a region surrounded by a polygon with vertexes constituted by circumferential center points of the flux barrier groups on an outer peripheral edge of the rotor as viewed in plan in a direction along a rotary shaft of the rotor is defined as a polygonal region, the plurality of flux barriers in each of the flux barrier groups include arcuate portions formed in the polygonal region. An arcuate center of the arcuate portions in each of the flux barrier groups is set to the circumferential center point of the flux barrier group on the outer peripheral edge of the rotor. When regions of the rotor interposed between two flux barriers that are adjacent to each other in the flux barrier groups are defined as ribs, and portions of the rotor that are close to the outer periphery of the rotor in the regions of the rotor interposed between flux barrier groups that are adjacent to each other are defined as connecting portions, a ratio of a width of the connecting portions to a width of the ribs is 0.53 or more and 0.8 or less.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
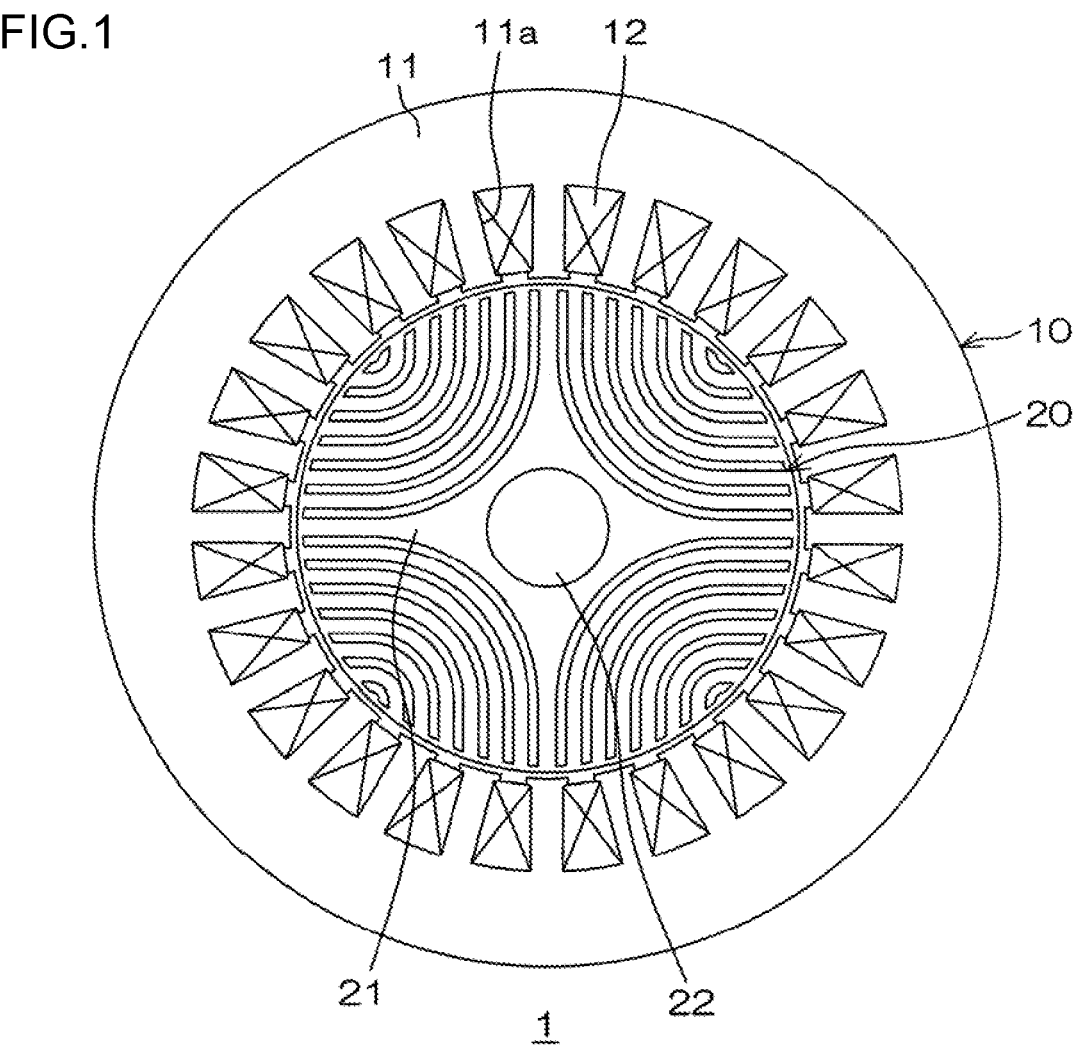
FIG. 1 is a cross-sectional view illustrating the configuration of a synchronous reluctance motor according to an embodiment of the present invention.
Figure 2:
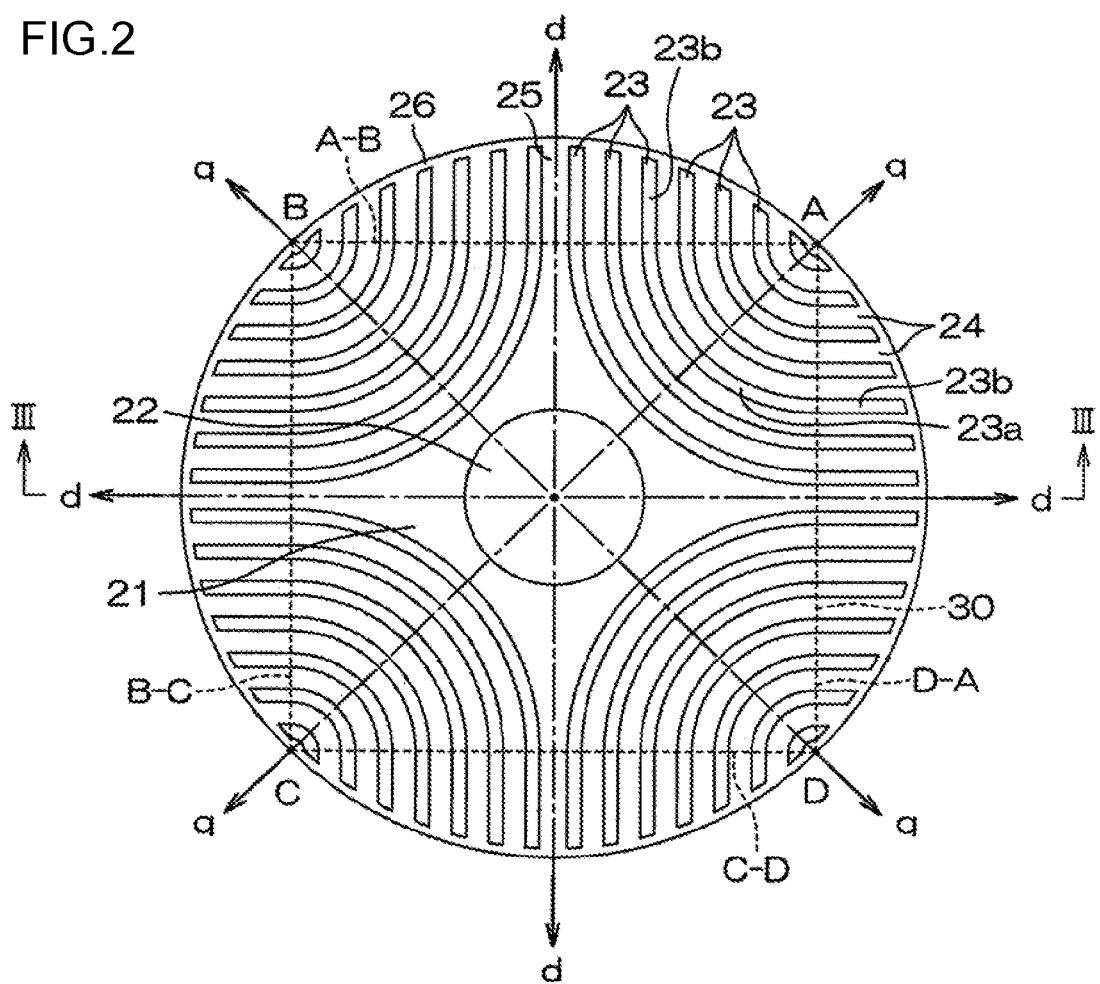
FIG. 2 is an enlarged plan view illustrating a rotor of the synchronous reluctance motor of FIG. 1.
Figure 3:
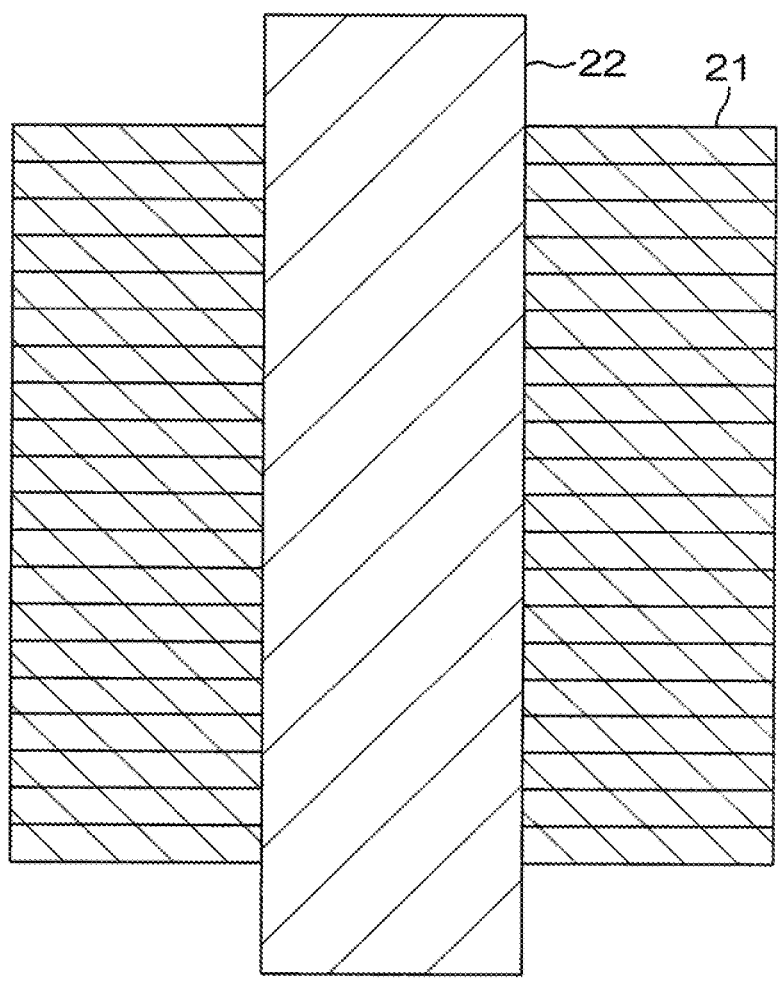
FIG. 3 is a sectional view taken along the line III-III of FIG. 2.
Figure 4:
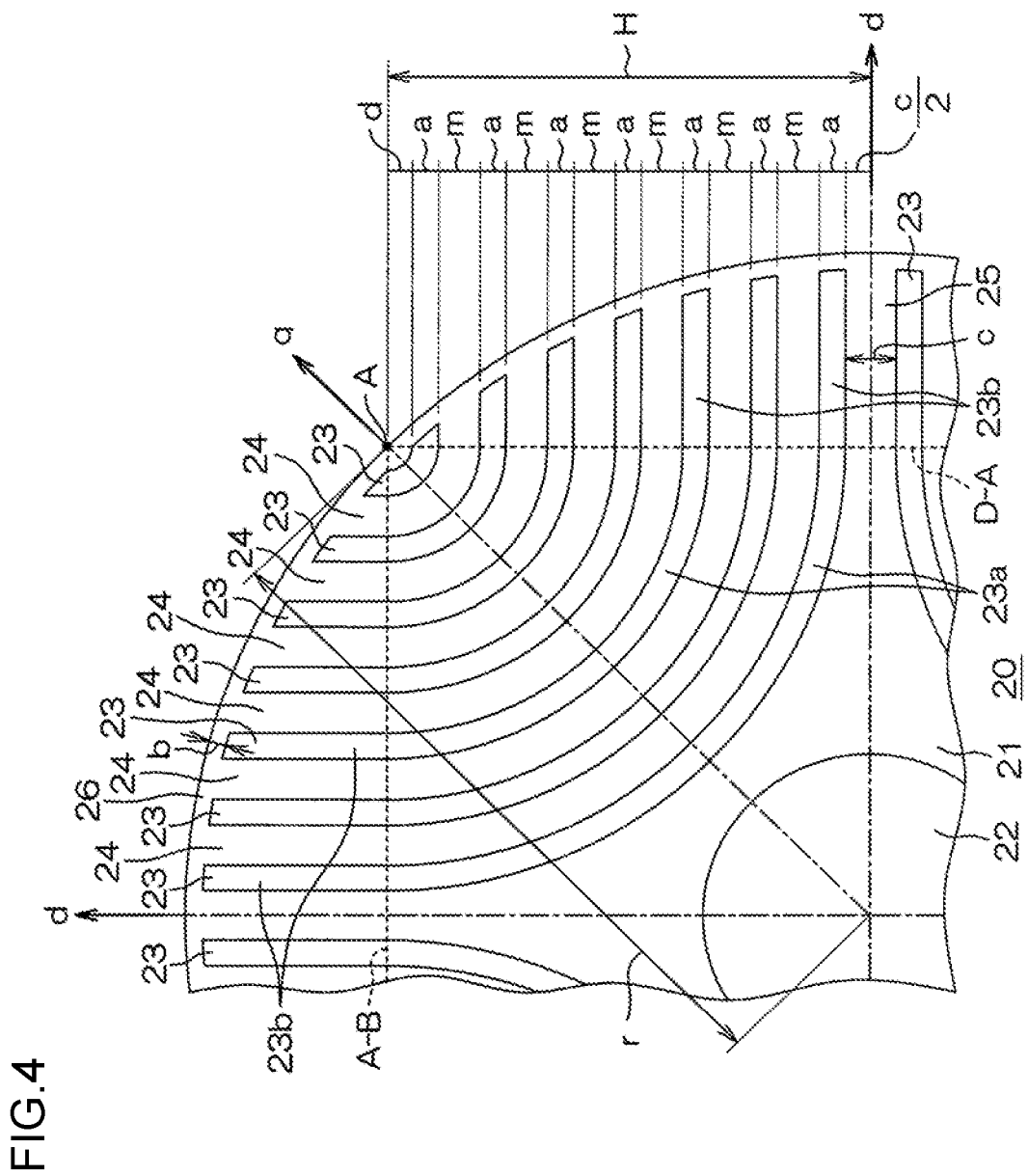
FIG. 4 is a partially enlarged plan view mainly illustrating one of flux barrier groups in detail.

An embodiment of the present invention will be described in detail below with reference to the accompanying drawings. FIG. 1 is a cross-sectional view illustrating the configuration of a synchronous reluctance motor according to an embodiment of the present invention. FIG. 2 is an enlarged plan view illustrating a rotor of the synchronous reluctance motor of FIG. 1. FIG. 3 is a sectional view taken along the line III-III of FIG. 2. FIG. 4 is a partially enlarged plan view mainly illustrating one of flux barrier groups in detail.

With reference to FIG. 1, a synchronous reluctance motor 1 (hereinafter referred to simply as a "motor 1") includes a stator (stationary element) 10 and a rotor (rotary element) 20. The stator 10 generates a rotating magnetic field. The rotor 20 is provided inside the stator 10, and rotated by the rotating magnetic field. The stator 10 includes an annular stator core 11 and stator coils 12. The stator core 11 is constituted by stacking a plurality of annular steel plates on each other. A plurality of slots 11a for insertion of the stator coils 12 are provided in the inner peripheral portion of the stator core 11. In the embodiment, three independent stator coils 12 are wound in the stator core 11, and the stator core 11 has 24 slots 11a.

With reference to FIGS. 1 to 4, the rotor 20 has four poles (two pairs of poles) in the embodiment. The rotor 20 includes a rotor core 21 and a rotor shaft (rotary shaft) 22. The rotor shaft 22 penetrates the center portion of the rotor core 21, and is fixed to the rotor core 21. The rotor core 21 is constituted by stacking a plurality of circular electromagnetic steel sheets having a hole in the center portion on each other. The rotor core 21 is provided with a number of flux barrier groups spaced from each other in the circumferential direction. The flux barrier groups are each constituted from a plurality of arcuate flux barriers (in this example, slits (air layers)) 23. The number of the flux barrier groups corresponds to the number of poles. The flux barriers 23 are disposed in a plurality of layers from the outer peripheral side toward the rotor shaft 22, and are convex toward the rotor shaft 22. In this example, the rotor core 21 is provided with four flux barrier groups spaced from each other in the circumferential direction. The flux barriers 23 in each of the flux barrier groups are provided in seven layers. That is, each of the flux barrier groups is constituted from seven flux barriers 23 with different lengths. The flux barriers may be formed from a non-magnetic material such as a resin, rather than being formed as slits.

With reference to FIGS. 2 and 4, regions of the rotor core 21 interposed between two flux barriers 23 that are adjacent to each other in the same flux barrier group in a plan view seen in the direction along the rotor shaft 22 are defined as ribs 24. Portions of the rotor core 21 that are close to the outer periphery of the rotor core 21 in the regions of the rotor core 21 interposed between flux barrier groups that are adjacent to each other are defined as connecting portions 25. An annular region at the outer peripheral portion of the rotor core 21, including a portion between the outer peripheral edge of the rotor core 21 and the end portions of the flux barriers 23, is defined as a bridge 26.

An axis that passes through the center, in the circumferential direction, of the flux barriers 23 in the flux barrier group and that extends in the radial direction of the rotor core 21 is defined as a q-axis. An axis that passes between flux barrier groups that are adjacent to each other and that extends in the radial direction of the rotor core 21 is defined as a d-axis. The flux barriers 23 hinder the flow of magnetic flux. Therefore, magnetic flux from the stator 11 directed from one of two adjacent q-axes toward the other is not easily conducted. In contrast, magnetic flux directed from one of two adjacent d-axes toward the other is easily conducted by the ribs 24 between the flux barriers 23.

When a rotating magnetic field is applied to the rotor 20 by the stator 10, reluctance torque T is generated from the motor 1. The reluctance torque T is represented by the following formula (1):

$$T = Pn \cdot (Ld - Lq) \cdot Id \cdot Iq \quad (1)$$

In the formula (1), Pn is the number of pairs of poles, Ld is the d-axis inductance, Lq is the q-axis inductance, Id is the d-axis current, and Iq is the q-axis current.

Thus, the reluctance torque (output torque) T is increased by increasing the difference (Ld−Lq) between the d-axis inductance Ld and the q-axis inductance Lq. In the embodiment, in order to increase the difference (Ld−Lq), the flux barriers 23 are provided to increase the magnetic resistance of the magnetic path in the q-axis direction, and to reduce the magnetic resistance of the magnetic path in the d-axis direction. In the embodiment, further, in order to increase the reluctance torque T (motor output) while reducing torque ripple, the following design is adopted. That is, the shape of the flux barriers 23 as viewed in plan is set to an appropriate shape. In addition, the ratio of the width of the ribs 24 to the width of the flux barriers 23 is set to an appropriate value. Further, the ratio of the width of the connecting portions 25 to the width of the ribs 24 is set to an appropriate value. Such features will be described in detail below.

First, the shape of the flux barriers 23 as viewed in plan will be described with reference to FIGS. 2 and 4. The circumferential center points of the flux barrier groups on the outer peripheral edge of the rotor 20 are defined as A, B, C, and D. A region of the rotor 20 surrounded by a polygon (in this example, a quadrangle) with vertexes A, B, C, and D as viewed in plan is defined as a polygonal region (in this example, a quadrangular region) 30. A side or a line segment that connects between the vertex A and the vertex B of the polygonal region 30 is occasionally represented as A-B. A side or a line segment that connects between the vertex B and the vertex C is occasionally represented as B-C. A side or a line segment that connects between the vertex C and the vertex D is occasionally represented as C-D. A side or a line segment that connects between the vertex D and the vertex A is occasionally represented as D-A.

The plurality of flux barriers 23 in each of the flux barrier groups are constituted from arcuate portions 23a provided in the polygonal region 30 as viewed in plan, and linear portions 23b. The linear portions 23b extend from both end portions of the arcuate portions 23a to a region outside the polygonal region 30. The arcuate center of the plurality of arcuate portions 23a in each of the flux barrier groups is set to the circumferential center point A, B, C, or D of the flux barrier group on the outer peripheral edge of the rotor 20. The linear portions 23b which extend from the end portions of the arcuate portions 23a extend in a direction that is perpendicular to one of the four sides of the polygonal region 30 that is the closest to the end portions of the arcuate portions 23a as viewed in plan. In other words, the linear portions 23b which extend from the end portions of the arcuate portions 23a extend in the direction of a tangent to the arcuate portions 23a from the end portions of the arcuate portions 23a.

For example, the plurality of flux barriers 23 in one of the flux barrier groups mainly illustrated in FIG. 4 are constituted from a plurality of arcuate portions 23a and a plurality of linear portions 23b as viewed in plan. The arcuate portions 23a are centered on the point A. The linear portions 23b extend perpendicularly to the side A-B from first ends of the arcuate portions 23a on the side of the side A-B, and extend perpendicularly to the side D-A from second ends of the arcuate portions 23a on the side of the side D-A.

The reason that the shape of the plurality of flux barriers 23 in each of the flux barrier groups as viewed in plan is set as described above will be described using the flux barrier group mainly illustrated in FIG. 4 as an example. In general, when a planar circuit with an area of S is placed in a magnetic field with a magnetic flux density of B [wb], magnetic flux φ which penetrates the planar circuit with an area of S is represented by the following formula (2):

$$\phi = BS \sin \theta \quad (2)$$

θ is the angle formed by the plane of the planar circuit and the direction of magnetic flux.

From the formula (2), it is found that magnetic flux φ is maximized when the angle θ formed by the plane of the planar circuit and the direction of magnetic flux is 90 degrees. If the shape of the plurality of flux barriers 23 in the flux barrier group mainly illustrated in FIG. 4 as viewed in plan is set as described above, magnetic flux that flows in the d-axis direction passes perpendicularly to the cross sections of the ribs 24 along the line segment D-A, and the cross-sectional area of the ribs 24 along the line segment D-A is maximized. Consequently, the magnetism utilization rate is enhanced, and thus the output torque T can be increased.

The arcuate portions 23a can be formed at a position that is close to the center of the rotor 20 compared to a case where the arcuate center of the flux barriers 23 is set on the q-axis and outward of the outer peripheral edge of the rotor 20. Consequently, the width of the ribs 24 can be increased, and thus the magnetic resistance of the magnetic path in the d-axis direction can be reduced. Consequently, the output torque T can be increased.

Next, the ratio of the width of the ribs 24 to the width of the flux barriers 23 will be described. As illustrated in FIG. 4, the width of the flux barriers 23 is defined as a [mm], the width of the ribs 24 is defined as m [mm], the width of the bridge 26 is defined as b [mm], and the width of the connecting portions 25 is defined as c [mm]. The length of a section from the point A to the flux barrier 23 that is the closest to the point A on the line segment D-A is defined as d [mm]. The distance from the point A to the midpoint of the line segment D-A on the line segment D-A is defined as H [mm]. When the radius of the rotor 20 is defined as r [mm], $H = r/2^{1/2}$ is satisfied.

As seen from FIG. 4, the following formula (3) is satisfied:

$$d + 7a + 6m + c/2 = H \quad (3)$$

b is preferably 0.5 mm or less. d is preferably $2^{1/2} \cdot b$ or more. c is preferably 0.5 mm or more and 3 mm or less.
In the embodiment, r, c, d, m, and a are set as follows, for example.
r=24.8 mm, c=2 mm, b=0.5 mm, d=$2^{1/2} \cdot b$, m=1.7 mm, and a=0.8 mm.

Table 1 indicates the result of simulating the output torque with respect to the width (rib width) m of the ribs 24 and the result of simulating the torque ripple with respect to the width m of the ribs 24 for a case where the sum of the width m of the ribs 24 and the width (slit width) a of the flux barriers 23 is constant. Here, the sum of the width m of the ribs 24 and the width a of the flux barriers 23 is determined as 2.2 mm to 2.5 mm. Table 1 also indicates the values of the width a of the flux barriers 23 corresponding to the width m of the ribs 24, and a ratio m/a of the width m of the ribs 24 to the width a of the flux barriers 23 corresponding to the width m of the ribs 24.

TABLE 1

| Rib width m [mm] | Slit width a [mm] | m/a | Torque [Nm] | Torque ripple [%] |
|---|---|---|---|---|
| 0.8 | 1.7 | 0.47 | 3.30 | 34.0 |
| 0.9 | 1.6 | 0.56 | 3.58 | 31.5 |
| 1 | 1.5 | 0.67 | 3.82 | 28.5 |
| 1.1 | 1.4 | 0.79 | 4.05 | 23.5 |
| 1.25 | 1.25 | 1.00 | 4.32 | 17.1 |
| 1.3 | 1.2 | 1.08 | 4.40 | 15.6 |
| 1.4 | 1.1 | 1.27 | 4.50 | 12.3 |
| 1.5 | 1 | 1.50 | 4.59 | 9.30 |
| 1.7 | 0.8 | 2.13 | 4.59 | 6.50 |
| 1.8 | 0.6 | 3.00 | 4.52 | 8.40 |
| 1.9 | 0.4 | 4.75 | 4.41 | 10.1 |
| 2 | 0.2 | 10.00 | 4.23 | 12.1 |

Figure 5A:
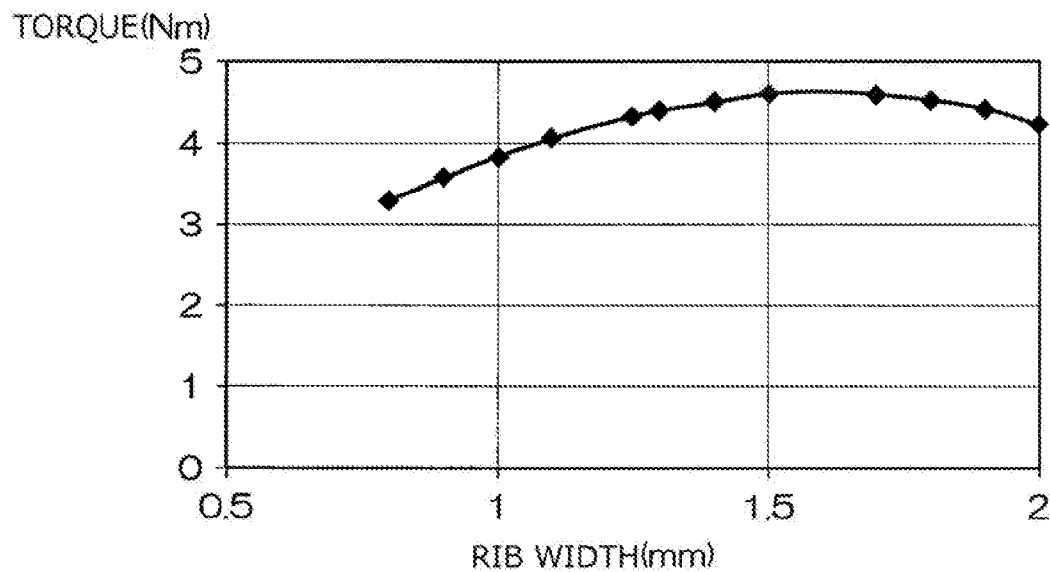
FIG. 5A is a graph illustrating the result of simulating output torque with respect to a width m of ribs for a case where the sum of the width m of the ribs and a width a of flux barriers is constant.
Figure 5B:
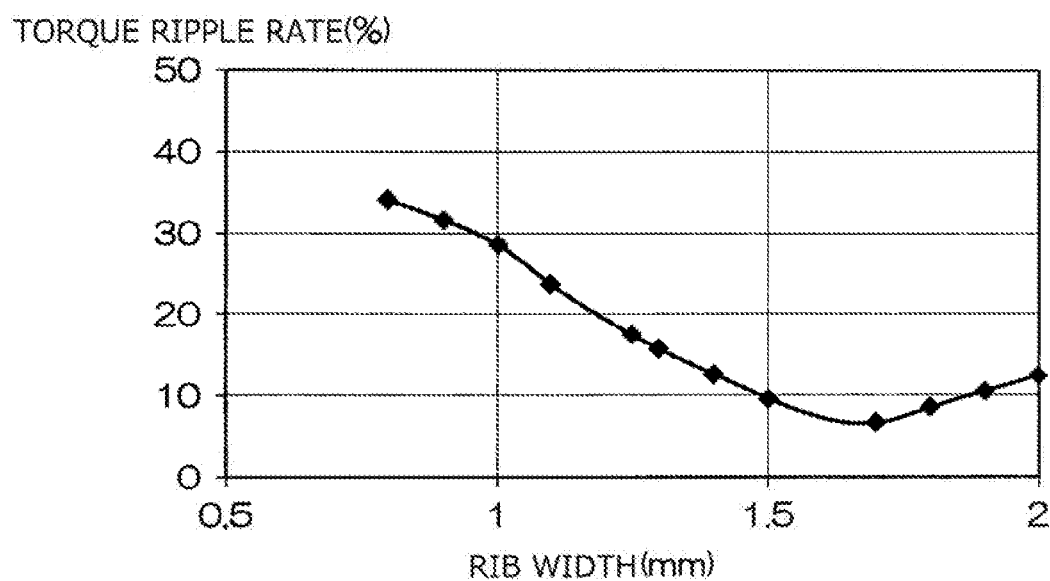
FIG. 5B is a graph illustrating the result of simulating torque ripple with respect to the width m of the ribs for a case where the sum of the width m of the ribs and the width a of the flux barriers is constant.

FIG. 5A is a graph indicating the result of simulating the output torque with respect to the width m of the ribs 24, among the simulation results indicated in Table 1. FIG. 5B is a graph indicating the result of simulating the torque ripple with respect to the width m of the ribs 24, among the simulation results indicated in Table 1. As indicated in Table 1 and FIG. 5A, the output torque is maximized when the width m of the ribs 24 is 1.5 mm to 1.7 mm (the width a of the flux barriers 23 is 1.0 mm to 0.8 mm). That is, the output torque is maximized when the ratio m/a of the width m of the ribs 24 to the width a of the flux barriers 23 is 1.50 to 2.13. When the width m of the ribs 24 is in the range of 1.5 mm or less, the amount of magnetic flux that passes through the ribs 24 is increased as the width m of the ribs 24 is increased. Therefore, it is considered that the output torque is increased as the width m of the ribs 24 is increased when the width m of the ribs 24 is in this range (1.5 mm or less). When the width m of the ribs 24 is increased, the width a of the flux barriers 23 is reduced. When the width m of the ribs 24 is more than 1.7 mm, the width a of the flux barriers 23 is too small. Therefore, it is considered that much magnetic flux leaks in the q-axis direction. Therefore, the output torque is reduced as the width m of the ribs 24 is increased to be more than 1.7 mm.

As indicated in Table 1 and FIG. 5B, the torque ripple is minimized when the width m of the ribs 24 is about 1.7 mm (the width a of the flux barriers 23 is about 0.8 mm). That is, the torque ripple is minimized when the ratio m/a of the width m of the ribs 24 to the width a of the flux barriers 23 is about 2.13. For this reason, it is found that, in order to increase the output torque while suppressing the torque ripple, the width m of the ribs 24 is preferably 1.5 or more and 1.9 or less, more preferably 1.6 or more and 1.8 or less. In other words, it is found that, in order to increase the output torque while suppressing the torque ripple, the ratio m/a of the width m of the ribs 24 to the width a of the flux barriers 23 is preferably 1.50 or more and 4.75 or less, more preferably 1.78 or more and 3.00 or less.

Table 2 indicates the result of simulating the torque ripple with respect to a ratio c/m of the width (connecting portion width) c of the connecting portions 25 to the width (rib width) m of the ribs 24 at the time when the width m of the ribs 24 and the width (slit width) a of the flux barriers 23 are constant and the width c of the connecting portions 25 and the length (section length d) of the section d are varied such that the distance H is constant. Here, the width m of the ribs 24 is determined as 1.70 mm, the width a of the flux barriers 23 is determined as 0.80 mm, and the distance H is determined as 17.50 mm. Table 2 indicates half (c/2) the width c of the connecting portions 25 in place of the width c of the connecting portions 25. It is assumed that d, a, m, c and H satisfy the formula (3).

TABLE 2

| c/m | Slit width a [mm] | Half (c/2) of connecting portion width c [mm] | Rib width m [mm] | Distance H [mm] | Torque ripple [%] |
|---|---|---|---|---|---|
| 0.29 | 0.80 | 0.25 | 1.70 | 17.50 | 14.72 |
| 0.35 | 0.80 | 0.30 | 1.70 | 17.50 | 14.51 |
| 0.41 | 0.80 | 0.35 | 1.70 | 17.50 | 13.80 |
| 0.47 | 0.80 | 0.40 | 1.70 | 17.50 | 13.12 |
| 0.53 | 0.80 | 0.45 | 1.70 | 17.50 | 11.97 |
| 0.59 | 0.80 | 0.50 | 1.70 | 17.50 | 10.74 |
| 0.65 | 0.80 | 0.55 | 1.70 | 17.50 | 9.86 |
| 0.71 | 0.80 | 0.60 | 1.70 | 17.50 | 8.73 |
| 0.76 | 0.80 | 0.65 | 1.70 | 17.50 | 8.88 |
| 0.82 | 0.80 | 0.70 | 1.70 | 17.50 | 9.00 |
| 0.88 | 0.80 | 0.75 | 1.70 | 17.50 | 8.77 |
| 0.94 | 0.80 | 0.80 | 1.70 | 17.50 | 8.38 |
| 1.00 | 0.80 | 0.85 | 1.70 | 17.50 | 8.23 |
| 1.06 | 0.80 | 0.90 | 1.70 | 17.50 | 8.25 |
| 1.12 | 0.80 | 0.95 | 1.70 | 17.50 | 8.22 |
| 1.18 | 0.80 | 1.00 | 1.70 | 17.50 | 8.23 |

Figure 6:
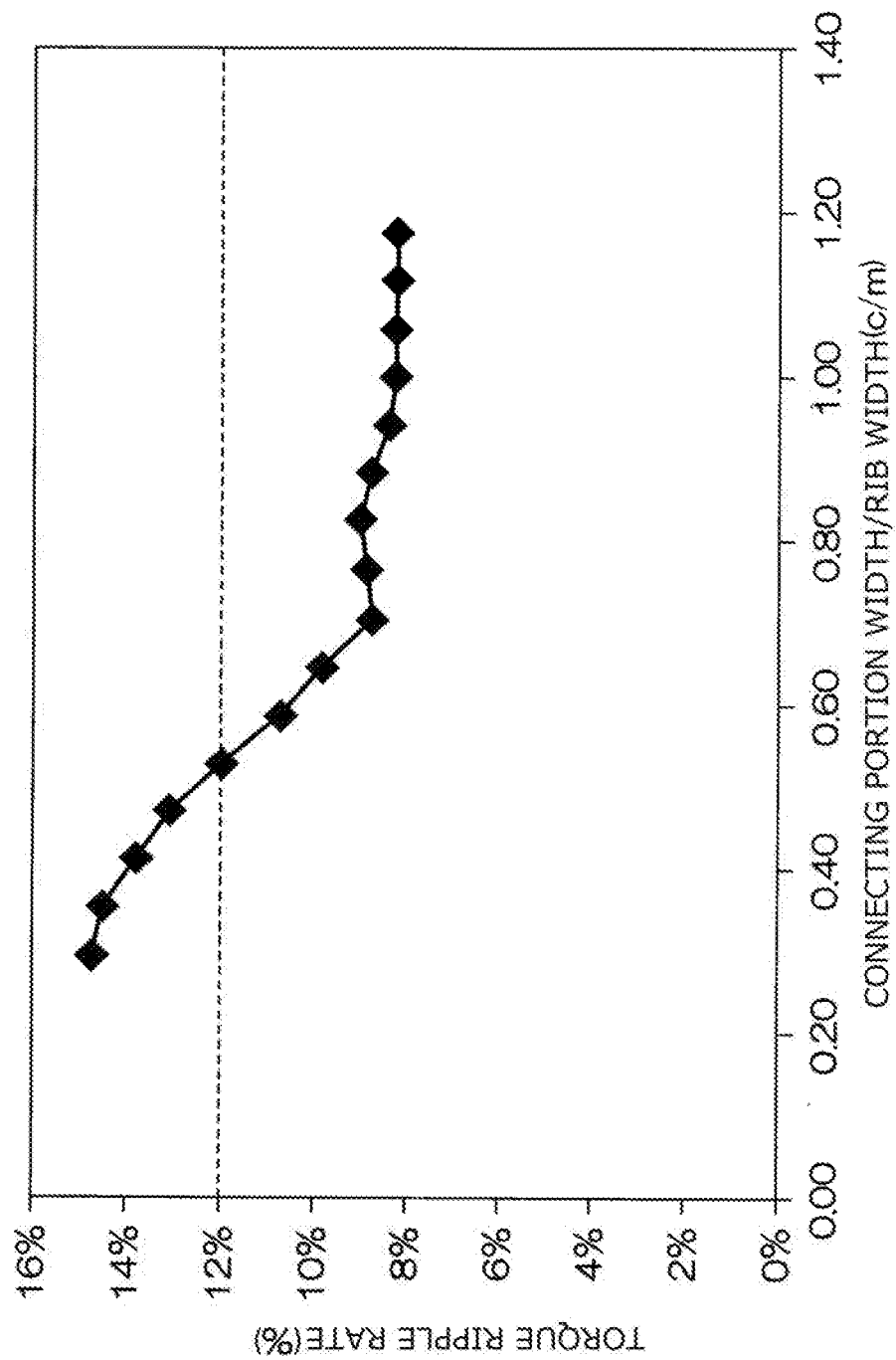
FIG. 6 is a graph illustrating the result of simulating torque ripple with respect to a ratio c/m of a width c of connecting portions to the width m of the ribs at the time when the width m of the ribs and the width a of the flux barriers are constant and the width c of the connecting portions and the length of a section d are varied such that a distance H is constant.

FIG. 6 is a graph indicating the simulation results indicated in Table 2. As indicated in Table 2 and FIG. 6, the torque ripple is less than 12% when the ratio of the width c of the connecting portions 25 to the width m of the ribs 24 is equal to or more than 0.53. In order to meet the formula (3), the ratio of the width c of the connecting portions 25 to the width m of the ribs 24 is 1.18 at highest. However, the torque ripple is less than 12% even in the case where the ratio of the width c of the connecting portions 25 to the width m of the ribs 24 is 1.18.

Table 3 indicates the result of simulating the torque ripple with respect to the ratio c/m of the width (connecting portion width) c of the connecting portions 25 to the width (rib width) m of the ribs 24 at the time when the width m of the ribs 24 and the length (section length d) of the section d are constant and the width c of the connecting portions 25 and the width (slit width) a of the flux barriers 23 are varied such that the distance H is constant. Here, the width m of the ribs 24 is determined as 1.70 mm, the length of the section d is determined as 0.7 mm, and the distance H is determined as 17.50 mm. Table 3 indicates half (c/2) the width c of the connecting portions 25 in place of the width c of the connecting portions 25. It is assumed that d, a, m, c and H satisfy the formula (3).

TABLE 3

| c/m | Slit width a [mm] | Half (c/2) of connecting portion width c [mm] | Rib width m [mm] | Distance H [mm] | Torque ripple [%] |
|---|---|---|---|---|---|
| 0.5 | 0.82 | 0.85 | 1.70 | 17.50 | 8.88 |
| 0.6 | 0.80 | 1.02 | 1.70 | 17.50 | 8.29 |
| 0.7 | 0.77 | 1.19 | 1.70 | 17.50 | 9.68 |
| 0.8 | 0.75 | 1.36 | 1.70 | 17.50 | 10.97 |
| 0.9 | 0.72 | 1.53 | 1.70 | 17.50 | 13.69 |
| 1 | 0.70 | 1.70 | 1.70 | 17.50 | 15.80 |
| 1.1 | 0.68 | 1.87 | 1.70 | 17.50 | 15.76 |
| 1.2 | 0.65 | 2.04 | 1.70 | 17.50 | 13.98 |
| 1.3 | 0.63 | 2.21 | 1.70 | 17.50 | 13.74 |
| 1.4 | 0.60 | 2.38 | 1.70 | 17.50 | 17.14 |
| 1.5 | 0.58 | 2.55 | 1.70 | 17.50 | 20.86 |
| 1.6 | 0.55 | 2.72 | 1.70 | 17.50 | 23.36 |
| 1.7 | 0.53 | 2.89 | 1.70 | 17.50 | 24.99 |
| 1.8 | 0.51 | 3.06 | 1.70 | 17.50 | 25.24 |
| 1.9 | 0.48 | 3.23 | 1.70 | 17.50 | 24.18 |
| 2 | 0.46 | 3.40 | 1.70 | 17.50 | 22.37 |
| 2.1 | 0.43 | 3.57 | 1.70 | 17.50 | 19.57 |
| 2.2 | 0.41 | 3.74 | 1.70 | 17.50 | 22.21 |
| 2.3 | 0.38 | 3.91 | 1.70 | 17.50 | 26.09 |
| 2.4 | 0.36 | 4.08 | 1.70 | 17.50 | 28.59 |
| 2.5 | 0.34 | 4.25 | 1.70 | 17.50 | 31.84 |
| 2.6 | 0.31 | 4.42 | 1.70 | 17.50 | 33.36 |
| 2.7 | 0.29 | 4.59 | 1.70 | 17.50 | 32.15 |
| 2.8 | 0.26 | 4.76 | 1.70 | 17.50 | 28.22 |
| 2.9 | 0.24 | 4.93 | 1.70 | 17.50 | 22.02 |
| 3 | 0.21 | 5.10 | 1.70 | 17.50 | 19.26 |
| 3.1 | 0.19 | 5.27 | 1.70 | 17.50 | 23.74 |
| 3.2 | 0.17 | 5.44 | 1.70 | 17.50 | 28.39 |
| 3.3 | 0.14 | 5.61 | 1.70 | 17.50 | 31.71 |
| 3.4 | 0.12 | 5.78 | 1.70 | 17.50 | 35.23 |
| 3.5 | 0.09 | 5.95 | 1.70 | 17.50 | 35.96 |

Figure 7:
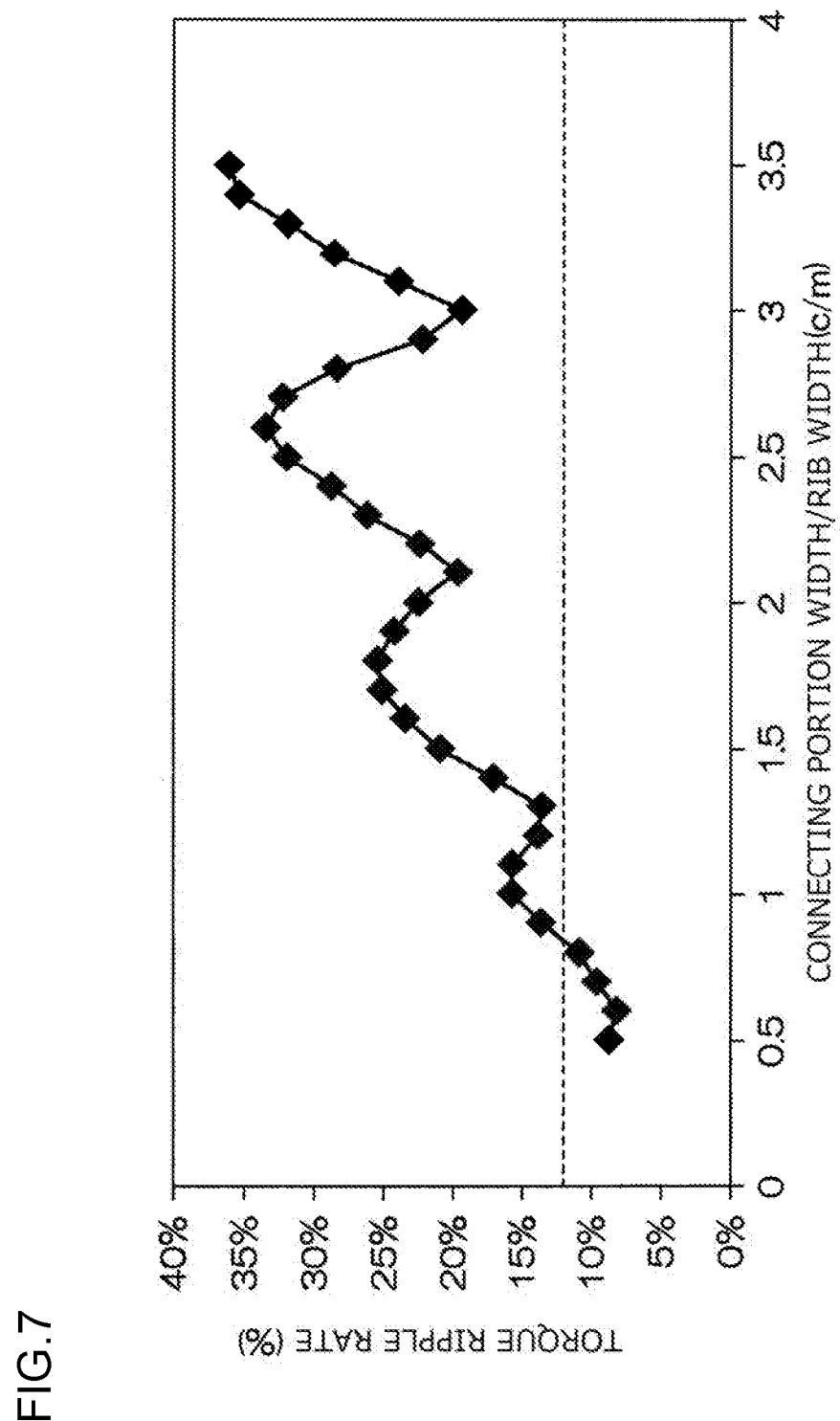
FIG. 7 is a graph illustrating the result of simulating torque ripple with respect to the ratio c/m of the width c of the connecting portions to the width m of the ribs at the time when the width m of the ribs and the length of the section d are constant and the width c of the connecting portions and the width a of the flux barriers are varied such that the distance H is constant.

FIG. 7 is a graph indicating the simulation results indicated in Table 3. As indicated in Table 3 and FIG. 7, the torque ripple is less than 12% when the ratio of the width c of the connecting portions 25 to the width m of the ribs 24 is 0.5 or more and 0.8 or less. Table 4 indicates the result of simulating the torque ripple with respect to the ratio c/m of the width (connecting portion width) c of the connecting portions 25 to the width (rib width) m of the ribs 24 at the time when the width (slit width) a of the flux barriers 23 and the length (section length d) of the section d are constant and the width c of the connecting portions 25 and the width m of the ribs 24 are varied such that the distance H is constant. Here, the width a of the flux barriers 23 is determined as 0.8 mm, the length of the section d is determined as 0.7 mm, and the distance H is determined as 17.50 mm. It is assumed that d, a, m, c and H satisfy the formula (3).

TABLE 4

| c/m | Slit width a [mm] | Half (c/2) of connecting portion width c [mm] | Rib width m [mm] | Distance H [mm] | Torque ripple [%] |
|---|---|---|---|---|---|
| 0.5 | 0.8 | 0.45 | 1.79 | 17.50 | 9.59 |
| 0.6 | 0.8 | 0.53 | 1.78 | 17.50 | 9.44 |
| 0.7 | 0.8 | 0.62 | 1.76 | 17.50 | 9.77 |
| 0.8 | 0.8 | 0.70 | 1.75 | 17.50 | 9.81 |
| 0.9 | 0.8 | 0.78 | 1.74 | 17.50 | 9.48 |
| 1 | 0.8 | 0.86 | 1.72 | 17.50 | 8.78 |
| 1.1 | 0.8 | 0.94 | 1.71 | 17.50 | 8.02 |
| 1.2 | 0.8 | 1.02 | 1.70 | 17.50 | 8.29 |
| 1.3 | 0.8 | 1.09 | 1.68 | 17.50 | 8.85 |
| 1.4 | 0.8 | 1.17 | 1.67 | 17.50 | 9.78 |
| 1.5 | 0.8 | 1.24 | 1.66 | 17.50 | 10.27 |
| 1.6 | 0.8 | 1.32 | 1.65 | 17.50 | 11.43 |
| 1.7 | 0.8 | 1.39 | 1.64 | 17.50 | 12.34 |
| 1.8 | 0.8 | 1.46 | 1.62 | 17.50 | 13.45 |
| 1.9 | 0.8 | 1.53 | 1.61 | 17.50 | 14.08 |
| 2 | 0.8 | 1.60 | 1.60 | 17.50 | 14.61 |
| 2.1 | 0.8 | 1.67 | 1.59 | 17.50 | 15.20 |
| 2.2 | 0.8 | 1.74 | 1.58 | 17.50 | 15.37 |
| 2.3 | 0.8 | 1.80 | 1.57 | 17.50 | 15.39 |
| 2.4 | 0.8 | 1.87 | 1.56 | 17.50 | 15.01 |
| 2.5 | 0.8 | 1.93 | 1.54 | 17.50 | 14.66 |
| 2.6 | 0.8 | 1.99 | 1.53 | 17.50 | 13.93 |
| 2.7 | 0.8 | 2.06 | 1.52 | 17.50 | 13.88 |
| 2.8 | 0.8 | 2.12 | 1.51 | 17.50 | 14.67 |
| 2.9 | 0.8 | 2.18 | 1.50 | 17.50 | 15.49 |

TABLE 4-continued

| c/m | Slit width a [mm] | Half (c/2) of connecting portion width c [mm] | Rib width m [mm] | Distance H [mm] | Torque ripple [%] |
|---|---|---|---|---|---|
| 3 | 0.8 | 2.24 | 1.49 | 17.50 | 16.44 |
| 3.1 | 0.8 | 2.30 | 1.48 | 17.50 | 17.48 |
| 3.2 | 0.8 | 2.36 | 1.47 | 17.50 | 18.73 |
| 3.3 | 0.8 | 2.42 | 1.46 | 17.50 | 20.23 |
| 3.4 | 0.8 | 2.47 | 1.45 | 17.50 | 21.69 |
| 3.5 | 0.8 | 2.53 | 1.45 | 17.50 | 22.91 |
| 3.6 | 0.8 | 2.58 | 1.44 | 17.50 | 23.74 |
| 3.7 | 0.8 | 2.64 | 1.43 | 17.50 | 24.53 |
| 3.8 | 0.8 | 2.69 | 1.42 | 17.50 | 25.29 |
| 3.9 | 0.8 | 2.75 | 1.41 | 17.50 | 25.67 |
| 4 | 0.8 | 2.80 | 1.40 | 17.50 | 25.99 |
| 4.1 | 0.8 | 2.85 | 1.39 | 17.50 | 26.30 |
| 4.2 | 0.8 | 2.90 | 1.38 | 17.50 | 26.31 |
| 4.3 | 0.8 | 2.95 | 1.37 | 17.50 | 26.01 |
| 4.4 | 0.8 | 3.00 | 1.37 | 17.50 | 25.96 |
| 4.5 | 0.8 | 3.05 | 1.36 | 17.50 | 25.66 |
| 4.6 | 0.8 | 3.10 | 1.35 | 17.50 | 25.09 |
| 4.7 | 0.8 | 3.15 | 1.34 | 17.50 | 24.69 |
| 4.8 | 0.8 | 3.20 | 1.33 | 17.50 | 24.26 |
| 4.9 | 0.8 | 3.25 | 1.33 | 17.50 | 23.18 |
| 5 | 0.8 | 3.29 | 1.32 | 17.50 | 22.31 |

Figure 8:
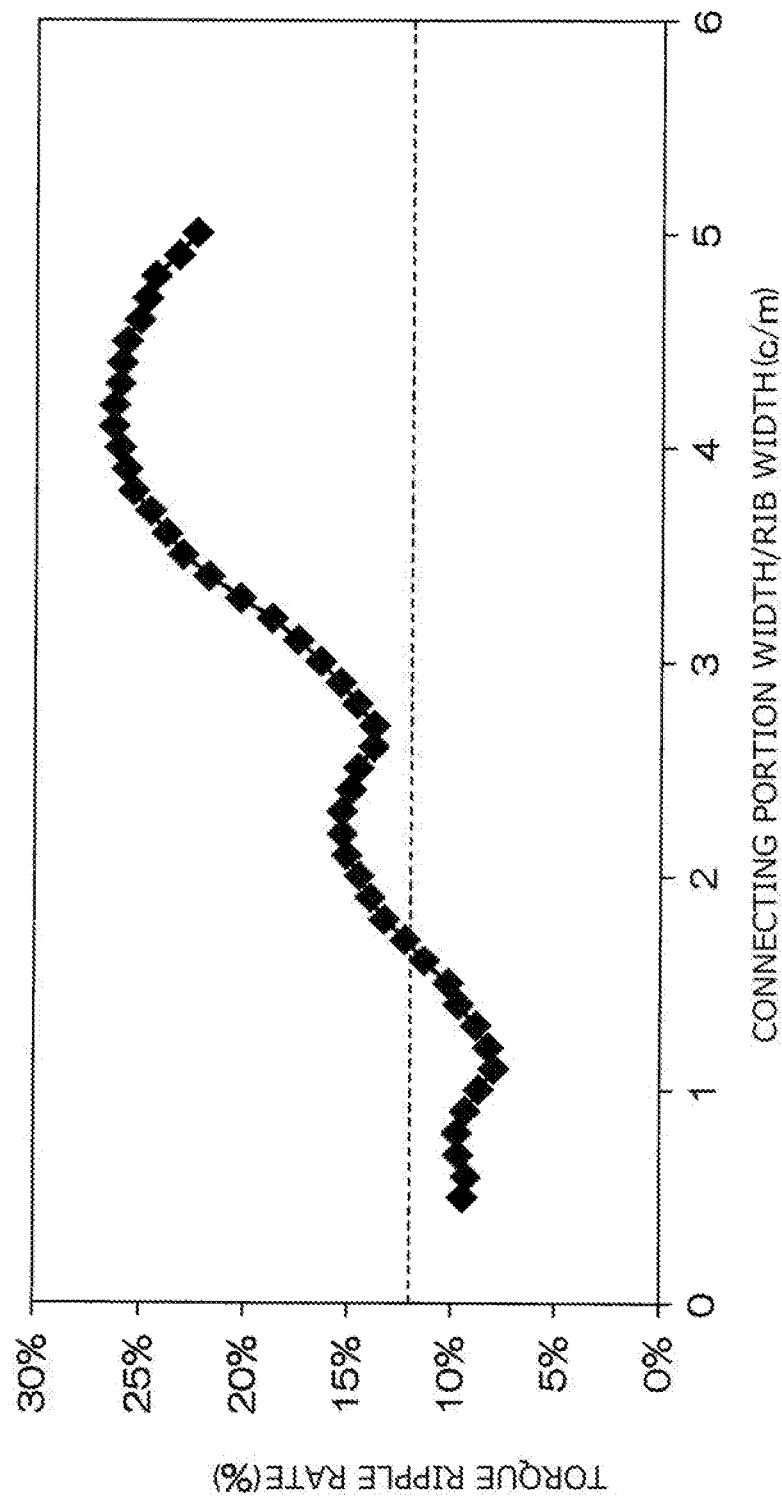
FIG. 8 is a graph illustrating the result of simulating torque ripple with respect to the ratio c/m of the width c of the connecting portions to the width m of the ribs at the time when the width a of the flux barriers and the length of the section d are constant and the width c of the connecting portions and the width m of the ribs are varied such that the distance H is constant.

FIG. 8 is a graph indicating the simulation results indicated in Table 4. As indicated in Table 4 and FIG. 8, the torque ripple is less than 12% when the ratio of the width c of the connecting portions 25 to the width m of the ribs 24 is 0.5 or more and 1.6 or less. From the simulation results of Tables 2, 3, and 4, it is found that the torque ripple is less than 12% when the ratio of the width c of the connecting portions 25 to the width m of the ribs 24 is 0.53 or more and 0.8 or less. For this reason, it is found that, in order to suppress the torque ripple to be low, the ratio of the width c of the connecting portions 25 to the width m of the ribs 24 is 0.53 or more and 0.8 or less.

While an embodiment of the present invention has been described above, the present invention may be implemented in other embodiments. For example, the rotor 20 has four poles (two pairs of poles) in the embodiment discussed above. However, the rotor 20 may have a different number of poles such as six poles (three pairs of poles) or eight poles (four pairs of poles). In the embodiment discussed above, the flux barriers 23 are provided in seven layers. However, the flux barriers 23 may be provided in a different number of layers such as five layers, six layers, eight layers, or nine layers.

The values of the radius r of the rotor 20, the width c of the connecting portions 25, the width m of the ribs 24, the width a of the flux barriers 23, and the width b of the bridge 26 are not limited to those indicated in the embodiment discussed above. The present invention can be applied to a synchronous motor for use in electric power steering systems, for example. However, the present invention can also be applied to a synchronous motor for use in systems other than electric power steering systems.

Besides, a variety of design changes may be made without departing from the scope described in the claims.

What is claimed is:

1. A synchronous reluctance motor comprising:
a stator; and
a rotor provided with a number of flux barrier groups each formed by a plurality of arcuate flux barriers and spaced from each other in a circumferential direction, the number of the flux barrier groups being equal to a number of poles, and the plurality of arcuate flux barriers being disposed in a plurality of layers from an outer periphery toward a center and being convex toward the center, wherein:
when a polygonal region surrounded by a polygon with vertexes constituted by circumferential center points of the flux barrier groups on an outer peripheral edge of the rotor as viewed in a plan view in a direction along a rotary shaft of the rotor is defined as a polygonal region, the plurality of flux barriers in each of the flux barrier groups include arcuate portions formed in the polygonal region,
an arcuate center of the arcuate portions in each of the flux barrier groups is set to the circumferential center point of the flux barrier group on the outer peripheral edge of the rotor, and
when regions of the rotor interposed between two flux barriers that are adjacent to each other in the flux barrier groups are defined as ribs, and portions of the rotor that are adjacent to the outer periphery of the rotor in the regions of the rotor interposed between flux barrier groups that are adjacent to each other are defined as connecting portions, a ratio of a width of the connecting portions to a width of the ribs is in a range of 0.53 to 0.8.

2. The synchronous reluctance motor according to claim 1, wherein a ratio of the width of the ribs to a width of the flux barriers is in a range of 1.50 to 4.75.

3. The synchronous reluctance motor according to claim 1, wherein the width of the connecting portions is in a range of 0.5 mm to 3.0 mm.

4. The synchronous reluctance motor according to claim 2, wherein the width of the connecting portions is in a range of 0.5 mm to 3.0 mm.

5. The synchronous reluctance motor according to claim 1, wherein the plurality of flux barriers in each of the flux barrier groups are formed by the arcuate portions formed in the polygonal region as viewed in the plan view, and linear portions that extend in a direction that is perpendicular to a side of the polygonal region from both end portions of the arcuate portions to a region outside the polygonal region.

6. The synchronous reluctance motor according to claim 2, wherein the plurality of flux barriers in each of the flux barrier groups are formed by the arcuate portions formed in the polygonal region as viewed in the plan view, and linear portions that extend in a direction that is perpendicular to a side of the polygonal region from both end portions of the arcuate portions to a region outside the polygonal region.

7. The synchronous reluctance motor according to claim 3, wherein the plurality of flux barriers in each of the flux barrier groups are formed by the arcuate portions formed in the polygonal region as viewed in the plan view, and linear portions that extend in a direction that is perpendicular to a side of the polygonal region from both end portions of the arcuate portions to a region outside the polygonal region.

8. The synchronous reluctance motor according to claim 4, wherein the plurality of flux barriers in each of the flux barrier groups are formed by the arcuate portions formed in the polygonal region as viewed in the plan view, and linear portions that extend in a direction that is perpendicular to a side of the polygonal region from both end portions of the arcuate portions to a region outside the polygonal region.

* * * * *